(12) United States Patent
Bender

(10) Patent No.: US 8,313,122 B2
(45) Date of Patent: Nov. 20, 2012

(54) SYSTEM AND METHOD FOR INSTALLING A WELDING POWER SUPPLY ONTO A TRAILER

(75) Inventor: David J. Bender, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 703 days.

(21) Appl. No.: 11/834,088

(22) Filed: Aug. 6, 2007

(65) Prior Publication Data

US 2009/0039614 A1    Feb. 12, 2009

(51) Int. Cl.
*B42D 15/00*    (2006.01)
*G09C 3/00*    (2006.01)

(52) U.S. Cl. ............... 283/67; 283/61; 283/62; 283/70; 283/74; 283/79; 283/81; 283/101; 283/115

(58) Field of Classification Search ............ 281/2, 5, 281/13, 51; 283/34, 61, 62, 67, 70, 74, 79, 283/80, 81, 101, 115, 117; 224/321, 400, 224/401, 402, 403, 410
See application file for complete search history.

(56) References Cited

U.S. PATENT DOCUMENTS

| | | | | |
|---|---|---|---|---|
| 2,683,459 A * | 7/1954 | Stephanson | ............ | 402/11 |
| 3,682,335 A * | 8/1972 | Smyth | ............ | 414/506 |
| 3,820,824 A * | 6/1974 | Maxwell | ............ | 283/36 |
| 4,122,947 A * | 10/1978 | Falla | ............ | 283/70 |
| 5,052,601 A * | 10/1991 | Carter et al. | ............ | 224/401 |
| 5,263,357 A * | 11/1993 | Dumais | ............ | 72/457 |
| 5,803,502 A * | 9/1998 | Noll et al. | ............ | 283/79 |
| 5,957,351 A * | 9/1999 | Gothier | ............ | 224/401 |
| 5,969,501 A * | 10/1999 | Glidden et al. | ............ | 320/101 |
| 6,557,898 B2 * | 5/2003 | Kissinger et al. | ............ | 283/70 |
| 2006/0181056 A1 * | 8/2006 | Weekes | ............ | 280/414.1 |

* cited by examiner

*Primary Examiner* — Dana Ross
*Assistant Examiner* — Justin V Lewis
(74) *Attorney, Agent, or Firm* — Hahn Loeser & Parks LLP

(57) ABSTRACT

A trailer includes reference marks that depict the position whereby cargo may be placed for proper installation on the trailer. The reference marks may be applied by affixing a label onto the frame of the trailer respective of the trailer axle. One or more reference marks may be applied depicting the multiple positions, one for each of differently sized cargo, which may be welding power supplies. Instructions may also be used in conjunction with the labels for instructing placement of the welding power supply at the appropriate position respective of the trailer axle.

21 Claims, 4 Drawing Sheets

US 8,313,122 B2

SYSTEM AND METHOD FOR INSTALLING A WELDING POWER SUPPLY ONTO A TRAILER

TECHNICAL FIELD

The present invention pertains to trailers for transporting a welding power supply, and more particularly, to trailers having labels for assisting in the installation of a welding power supply.

BACKGROUND OF THE INVENTION

Trailers are well known to carry a payload during travel between sites. Some trailers carry materials, tools or equipment to and from locations such as a construction work site. For some work environments, the trailer may carry a welding power supply, which may be used remotely at the work site. Trailers typically include a frame and ground engaging wheels connected to one or more axles. A trailer payload area carries the cargo and may be enclosed by ceiling and side walls. To connect the trailer to a towing vehicle, a hitch may be included, such as for example a ball hitch.

Frequently, welding is required where supply power may not be readily available. As such, the welding power supply may be an engine driven welding power supply incorporating a generator. The generator may supply power to the welder as well as to other power tools as may be needed on site. As different applications require different versions of welders and power tools, the trailer may be designed to carry one of many different types of welding power supplies.

Accordingly, it is not economical to design and build a different trailer for each size of welding power supply. Trailers are therefore designed to carry one of a plurality of various types of welding power supplies. As such, positioning the welding power supply onto the trailer can be critical to safely transporting the welder to and from the work site. For example, placing the center of gravity of the welder with respect to the axle is important to ensuring that the proper tongue weight results for towing purposes. More particularly, the center of gravity of the welder may be placed in front of the axle in the direction toward the trailer hitch. However, it is not always easy to ascertain the center of gravity from looking at the welding power supply. If the welder is not positioned properly, it may cause undue strain on the trailer components or destabilize the trailer during use.

In light thereof, there is a need for a system to assist a user in properly installing a welding power supply onto a trailer. The embodiments of the present invention obviate the aforementioned problems of installing trailer payloads and in particular welding power supplies.

BRIEF SUMMARY

In one embodiment of the present invention a method for indicating the placement of an associated welding power supply on a trailer includes providing a trailer having a trailer frame, at least a first axle operatively connected to the trailer frame and one or more ground engaging wheels rotatably connected to the at least a first axle and marking the trailer with indicia for selectively positioning an associated welding power supply on the trailer. The method may further include instructing the user to install the associated welding power supply corresponding to the indicia.

One aspect of the embodiments of the present invention includes marking the trailer with indicia depicting one or more longitudinal positions for selectively positioning an associated welding power supply respective to the at least a first axle of the trailer.

In another aspect of the embodiments of the present invention the indicia may depict a series of indicator marks for installing one of a plurality of substantially different size welders respectively.

Yet another aspect of the embodiments of the present invention comprises instructing the user to adjust the one or more selectively adjustable support members corresponding to said indicia.

In still another aspect of the embodiments of the present invention the indicia includes a label that may be affixed onto the trailer frame. The label may include an adhesive backing for holding the label in place once installed.

In even another aspect of the embodiments of the present invention the indicia may be painted or etched into the trailer frame.

In another embodiment of the present invention a trailer for carrying an associated cargo may include a trailer frame, at least a first axle connected to the trailer frame, one or more ground engaging wheels rotatably connected to the at least a first axle, and means for indicating the placement of the associated cargo.

Means for indicating the placement of the associated cargo may depict one or more positions for placement of the associated cargo with respect to the at least a first axle or the end of the trailer, which may be the end of a payload region.

One aspect of the embodiments of the present invention includes instructions for placement responsive to the size of the associated welding power supply being installed onto the trailer.

In another aspect of the embodiments of the present invention, means for indicating comprises a label. The label may depict a range of indicator markings or reference marks where to place the associated cargo.

In another embodiment of the present invention, a kit for instructing the placement of an associated welding power supply on an associated trailer includes at least a first label for indicating the position for installing the associated welding power supply onto the associated trailer. The trailer may include a trailer frame, an axle operatively connected to the trailer frame and one or more ground engaging wheels rotatably connected to the axle. The kit may also include instructions for installing the associated welding power supply onto the associated trailer.

In one aspect of the embodiments of the present invention, the instructions are printed instructions directing the user to position the associated welding power supply corresponding to the at least a first label.

In another aspect of the embodiments of the present invention, the instructions may be in electronic form and may be downloaded from the Internet or other storage media.

DETAILED DESCRIPTION OF THE INVENTION

Figure 1:
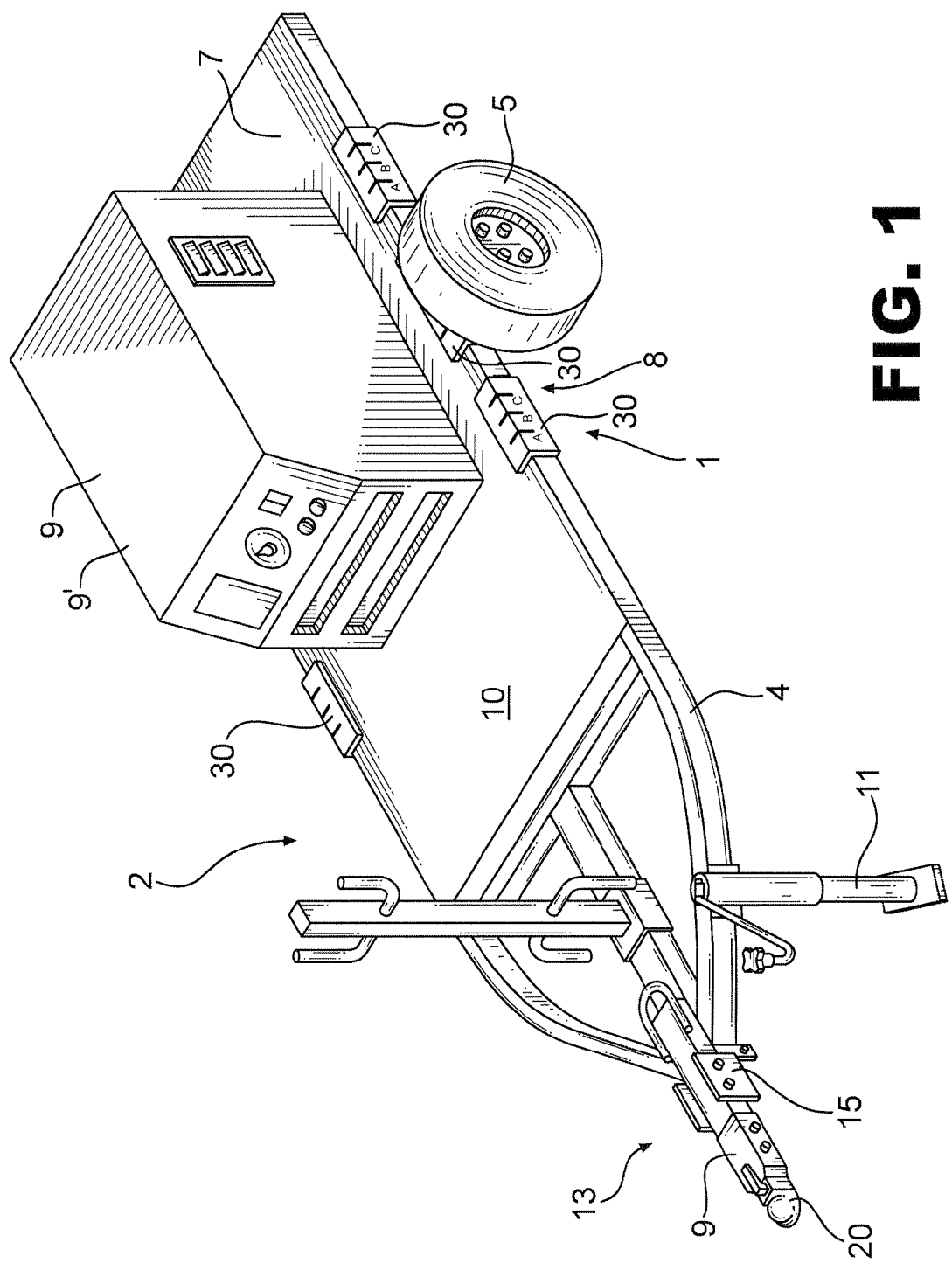
FIG. 1 is a perspective view of a welding power supply and a trailer incorporating indicia for instructing a person in installing one or more cargo items according to the embodiments of the present invention.

Referring now to the drawings wherein the showings are for purposes of illustrating embodiments of the invention only and not for purposes of limiting the same, FIG. 1 shows a trailer 2 incorporating a method and system 1 for assisting the user in installing a welding power supply onto the trailer 2. The trailer 2 may include a trailer frame 4 and one or more trailer wheels 5 in rotational connection with the trailer frame 4 via an axle 8, shown in FIG. 2. The trailer 2 may further include a payload region 7 for carrying one or more cargo items 9, which in an exemplary manner may be a welding power supply 9'. For adjusting the height of the front end 13, the trailer 2 may also include an adjustable stand 11. However, any means may be used for raising and/or lowering the front end 13 of the trailer 2. The trailer 2 may be selectively connected to a towing vehicle, not shown, via the trailer hitch 9. The trailer hitch 9 may be a generally longitudinal and substantially rigid trailer hitch 9 and may be attached to the frame 4 via fasteners 15, which may be threaded bolts. In one embodiment, the trailer hitch 9 may include a ball hitch connector 20. However, any type of trailer hitch 9 may be used on the trailer 2 as chosen with sound engineering judgment.

Figure 2:
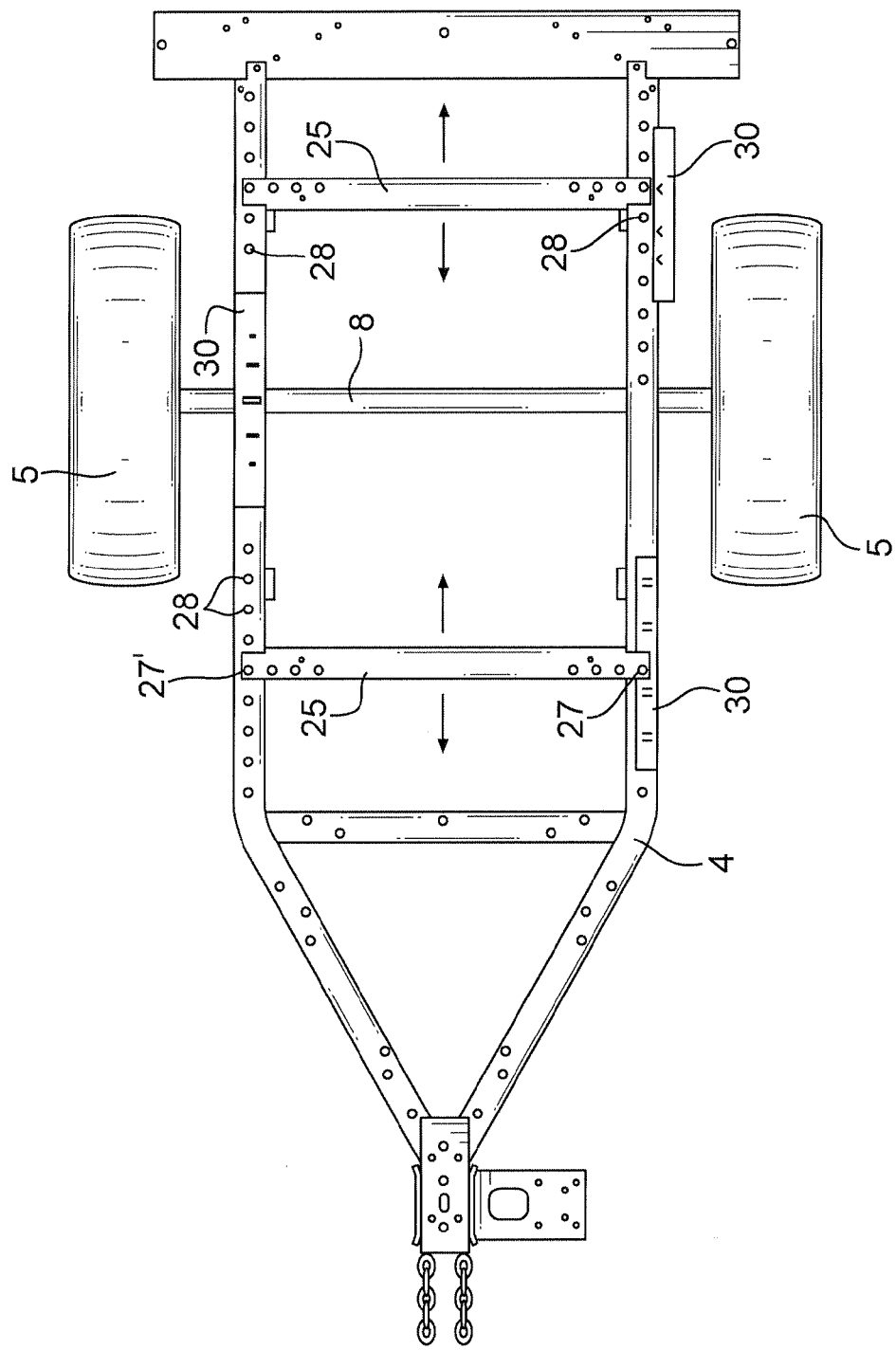
FIG. 2 is a top view of a trailer showing indicia according to the embodiments of the present invention.

With reference now to FIGS. 1 and 2, the trailer frame 1 can be transported from site to site via trailer wheels 5 or ground engaging wheels 5 rotatably connected to the axle 8 as mentioned above. The axle 8 may therefore support the trailer frame 4 and cargo items 9. Bearings, not shown, or other friction reducing devices may be installed between the axle 8 and the trailer 2 to facilitate continuous rotational motion as occurs during transportation. As such, the cargo items 9 may be positioned with respect to the axle 8 to ensure stability during movement of the trailer 2 over the terrain. As the trailer 2 can carry various sizes and weights of payloads, the trailer frame 4 may include adjustable support members 25 or cross members 25 that can be selectively placed longitudinally respective of the axle 8 and corresponding to the cargo items 9 being carried. It is noted that while FIG. 2 shows two cross members 25, different quantities of cross members 25 may be used without departing from the intended scope of coverage of the embodiments of the present invention. The cross members 25 are also shown extending across the width of the trailer frame 4 in a substantially perpendicular configuration. However, other configurations are contemplated where the cross members 25 may be skewed with respect to a longitudinal axis of the trailer frame 4 or run substantially parallel therewith. Still, any configuration of cross members 25 may be chosen as is appropriate for use with the embodiments of the subject invention. The cross members 25 may be selectively adjusted and then fixed in place via fasteners 27, which may be threaded bolts 27'. Holes 28 fashioned in the trailer frame 4 may be used to receive the fasteners 27. In this manner, the trailer frame 4 may be selectively configured to support various cargo items 9 as may be received and transported by the trailer 2. In an alternative embodiment, the cross members 25 may not be adjustable but rather fixedly connected to the trailer 4, for example, by welding.

With continued reference to FIGS. 1 and 2, by way of example, a welding power supply 9' may be installed onto and transported by the trailer 2. As welding power supplies 9' come in a variety of sizes, weights and configurations, it may be desirable to position a welding power supply 9', or its center of gravity, over the axle 8. Accordingly, the cross members 25 may therefore be selectively placed along the trailer frame 4 to accommodate whatever size welding power supply 9' is being transported by the trailer 2. In this manner, the cross members 25 may be positioned under distal ends of the welding power supply 9' to support the load. It is noted here that the cross members 25 may be pre-configured and fixed in place for use by a specific type of welding power supply 9'. In this embodiment, the trailer 2 may include a cargo bed 10 that lay on top of and is secured to the trailer frame 4. Accordingly, the welding power supply 9' may be fastened to the cargo bed 10. However, the welding power supply 9' may also be fastened to the trailer frame 4 and/or the cross members 25 in any manner chosen with sound engineering judgment.

Figure 3:
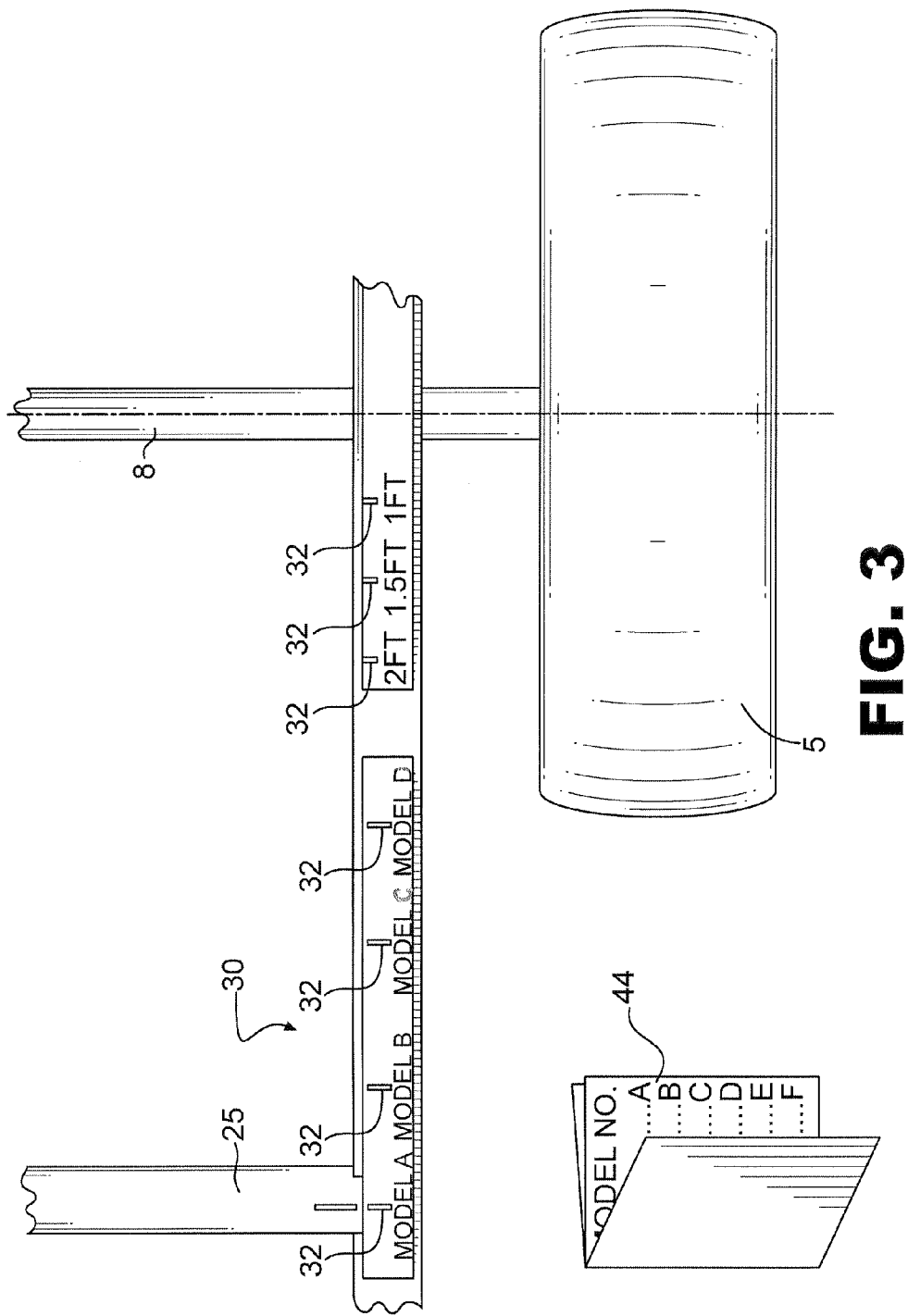
FIG. 3 is a top view of the trailer frame with labeled reference marks according to the embodiments of the present invention.

With reference now to FIGS. 2 and 3, the trailer 2 may include an indicium 30 or indicia 30 for use in assisting placement of the cargo items 9 onto the trailer 2. More specifically, the indicia 30 may help the user install one of a plurality of welding power supplies 9' onto the trailer 2 by indicating a particular position for placement of welding power supply 9' corresponding to its model, type and/or size. Accordingly, the indicia 30 may comprise marking the trailer 2 with at least one reference mark 32 depicting placement of a particular welding power supply 9'. It will be readily seen that the indicia 30 may include a series of reference marks 32 each pertaining to a different model or size of cargo item 9. A person of ordinary skill in the art will appreciate that while certain cargo items 9 are characteristically different, they may still be marked for placement by the same reference mark 32. In fact, any combination of reference marks 32 may indicate placement of any number of welding power supplies 9'.

The reference marks 32 may each indicate a distance from a reference point, which may be the axle 8, at which the cargo item 9 is to be placed. That is to say that the reference marks 32 may depict the proper placement of the distal ends of the welding power supply 9' spaced apart from the axle 8. In one embodiment, the reference marks 32 may be labeled with actual distances as measured in English or Metric units. A set of instructions 44, which may be in the form of a booklet or pamphlet 44, may be provided that cross references the placement of a particular welding power supply 9' with the labeled reference marks 32. In another embodiment, the reference marks 32 may be labeled with model numbers signifying where to place a particular unit. It is noted here that the welding power supplies 9' may also be labeled or marked with indicia that assist in placement and installation onto the trailer 2. However, it is to be construed that the manner of depicting, labeling or communicating the placement of a cargo item 9 may be chosen as is appropriate for use with the embodiments of the present invention. While the present embodiment describes placement of the cargo items 9 longitudinally along the trailer 2, indicia 30 may be included that also indicates lateral placement of the cargo items 9 as well.

Figure 4:
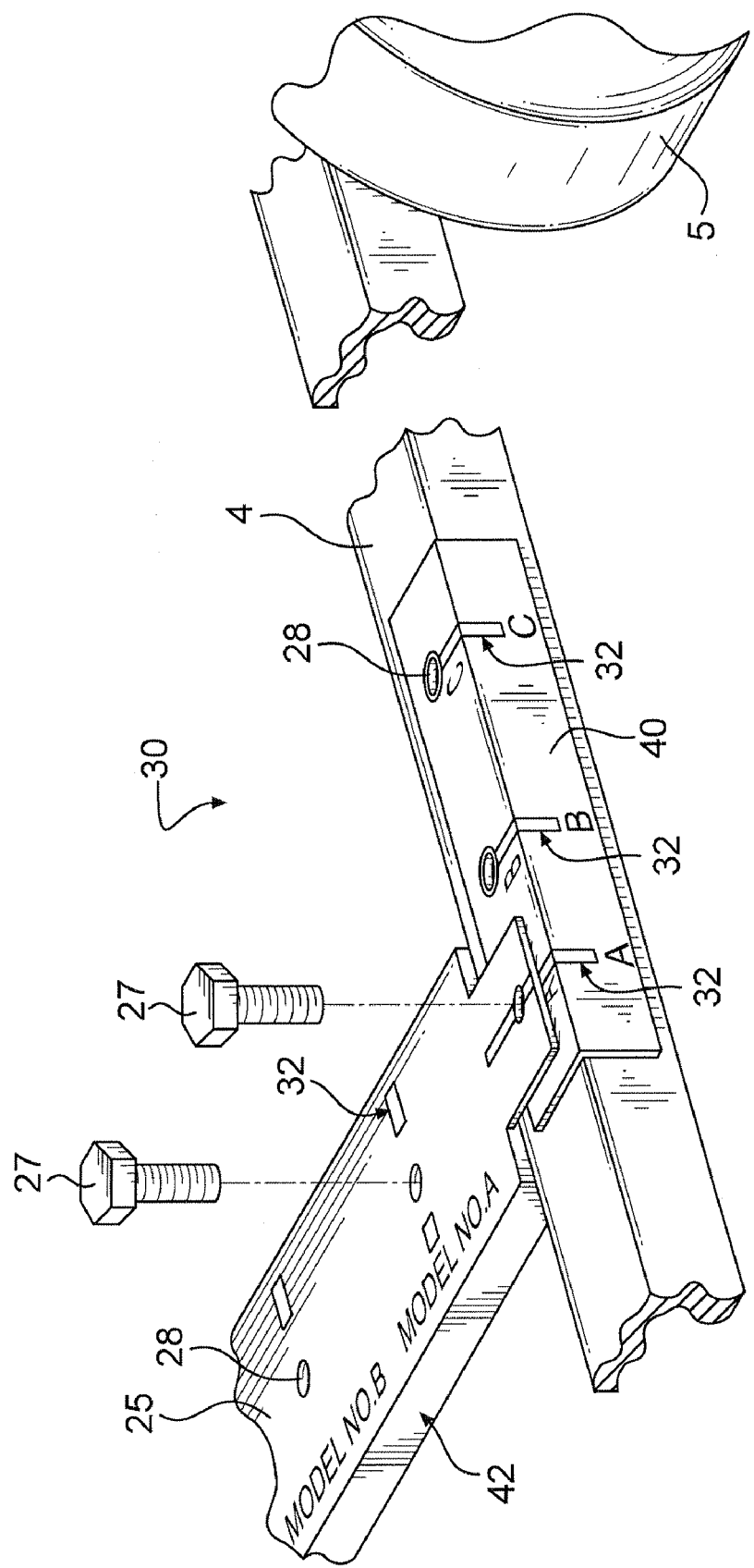
FIG. 4 is a close up perspective view of the trailer frame with labeled reference marks according to the embodiments of the present invention.

With reference now to FIG. 4, the indicia 30 may also be placed on the cross members 25 for indicating the position at which to mount a welding power supply 9'. In this embodiment, the trailer 2 may not utilize a cargo bed 10. Rather, the welding power supply 9' may be mounted directly to the cross members 25, also known as adapter rails. A series of holes 28 may be fashioned in the cross member 25 corresponding to the various models of welding power supplies 9' that may be mounted thereon with fasteners 27 or other similar means. Similarly the indicia 30 may include the actual name and/or model number of the welding power supply 9' being installed. Accordingly, the holes 28 may be labeled with a series of reference marks 32 that correspond to the mounting pattern of the particular welding power supplies 9'. Matching reference marks 32, with respect to those on the cross member 25, may be placed on the trailer frame 4 as well. It will be apparent to the observer that the reference marks 32 on the cross member 25 may pertain to a first dimension (width) of the welding power supply 9' and the matching reference marks on the trailer frame 4 may pertain to a second dimension (length), which may be an orthogonal dimension. As such, the person installing the welding power supply 9' may first adjust the cross member 25 longitudinally for a particular welding power supply 9', affix the cross members 25 in place and then mount the welding power supply 9' onto the cross member 25 at the holes 28 labeled for that particular unit.

The indicia 30 may be applied to the trailer 2 in a variety of ways. In one embodiment, the indicia 30 may be etched into the material from which the trailer frame 4 is constructed. Alternatively, the indicia 30 may be applied onto the surface of the trailer frame 4, as is the case of painting 42. Furthermore, decals 40, labels 40 or plaques 40' including the references marks 32 may be installed at the proper location onto the trailer frame 4. The decals 40 may include an adhesive backing that holds it in place. Alternatively, the plaques 40' may be affixed onto the trailer frame 4 via bolts, rivets, welding and the like. Still any manner of applying indicia 30 onto the trailer 2 may be chosen with sound judgment as is appropriate for use with the embodiments of the present invention. The indicia 30 may be placed on the top of the trailer frame 4. Alternatively, the indicia 30 may be placed on the side or both the side and top of the trailer frame 4 for convenient viewing by the person installing the unit. As previously mentioned, a set of instructions 44 may also accompany the trailer 2 cross referencing the indicia 30 with a list of the welding power supplies 9'. The set of instructions 44 may include a list of labels or characters, corresponding to the labels or characters on the trailer 2, cross referenced with a list of welding power supply models thereby instructing a person where to mount a particular unit. In an alternative embodiment, the set of instructions 44 may comprise a list of distances that each type of welding power supply should be mounted at with respect to the axle 8, the end of the trailer 2, or any other reference point chosen with sound engineering judgment.

For example, the trailer frame 4 may be labeled with a plurality of reference marks 32 at spaced intervals along the members of the trailer frame 4. The references marks 32 may comprise hash marks accompanied by a label as described above. The label may include one or more model numbers, a distance value from a reference point, and/or a generic character that may be cross referenced to a particular model of welding power supply 9'. The installer may identify and match the model number or type of welding power supply 9' with the indicia 30 on the trailer 2 thereby identifying the correct position to mount the unit. It is noted here that once the welding power supply 9' and indicia 30 have been identified, it may be necessary to adjust the position of the cross members 25 prior to installing the welding power supply 9' onto the trailer 2.

With reference now to all of the FIGURES, a method of indicating placement and/or instructing installing of a welding power supply onto a trailer will now be discussed. According to the embodiments of the present invention, the trailer frame 4 may be marked with indicia 30 depicting and/or describing the position at which a cargo item 9, and in particular a welding power supply 9', may be installed on the payload region 7 of the trailer 2. The indicia 30 may be marked, by one or more of the aforementioned methods, at spaced intervals along the length of the trailer frame 4 or on the cross members 25. It is noted that the indicia 30 may be marked on the trailer 2 at any place and by any individual, device or entity as is appropriate for use with the embodiments of the present invention. An instruction set 44, which may include a cross reference list of model numbers, may accompany the trailer 2 thereby showing the user which reference mark 32 should be used for placement of a particular welding power supply 9'. The user may then install the welding power supply 9' onto the trailer 2 in accordance with the reference marks 32 and/or the instruction set 44. It is to be construed that a separate instruction set may not be required. Rather the instructions for installing a welding power supply 9' may be contained completely within the indicia 30.

The invention has been described herein with reference to the preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A method for indicating placement of an associated welding power supply on a trailer, comprising the steps of:
   providing a trailer having
      a payload region,
      a trailer frame supporting the payload region,
      at least a first axle operatively connected to the trailer frame, wherein the trailer frame includes a first side and a second side transverse to the first axle, and
      one or more cross members selectively positionable along the frame corresponding to an associated welding power supply, the cross members positioned beneath the associated power supply supporting at least a portion thereof, wherein the cross members are substantially parallel to the first axle and fastened to the first and second sides; and,
   marking the trailer with indicia for selectively positioning the one or more cross members corresponding to the associated welding power supply in the payload region.

2. The method as defined in claim 1,
   wherein the step of: marking the trailer with indicia for selectively positioning an associated welding power supply in the payload region, comprises the step of:
      marking the trailer with indicia depicting one or more longitudinal positions for selectively positioning the one or more cross members corresponding to the associated welding power supply respective to the at least a first axle of the trailer.

3. The method as defined in claim 1,
   wherein the trailer is generally longitudinal having a first end; and,
   wherein the step of: marking the trailer with indicia for selectively positioning an associated welding power supply in the payload region, comprises the step of:
      marking the trailer with indicia depicting one or more longitudinal positions for selectively positioning the one or more cross members corresponding to the associated welding power supply respective to the first end of the trailer.

4. The method as defined in claim 2, wherein said indicia includes a series of reference marks for positioning the one or more cross members corresponding to one of a plurality of substantially different size welders respectively.

5. The method as defined in claim 1,
   further comprising the step of:
      instructing the user to adjust the one or more cross members corresponding to said indicia.

6. The method as defined in claim 1, wherein said indicia includes a label.

7. The method as defined in claim 6, wherein the label is affixed on to the trailer frame.

8. The method as defined in claim 1, wherein said indicia is etched into the trailer frame.

9. A trailer for carrying an associated cargo, comprising:
a trailer frame;
at least a first axle connected to the trailer frame, wherein the trailer frame includes a first side and a second side transverse to the first axle;
one or more ground engaging wheels rotatably connected to the at least a first axle;
one or more cross members selectively positionable along the frame corresponding to an associated cargo, the cross members positioned beneath the associated cargo supporting at least a portion thereof, substantially parallel to the first axle, and fastened to the first and second sides; and,
means for indicating the placement of the one or more cross members corresponding to the associated cargo.

10. The trailer as defined in claim 9, wherein means for indicating the placement of the associated cargo depicts one or more positions for placement of the one or more cross members corresponding to the associated cargo with respect to the at least a first axle.

11. The trailer as defined in claim 9, wherein the associated cargo is an associated welding power supply.

12. The trailer as defined in claim 9, wherein means for indicating depicts reference marks for placement responsive to the size of the associated welding power supply being installed onto the trailer.

13. The trailer as defined in claim 9, wherein means for indicating includes a label.

14. The trailer as defined in claim 9, wherein means for indicating is etched into the trailer frame.

15. The trailer as defined in claim 9, wherein means for indicating depicts a range of reference marks for placing the one or more cross members corresponding to one of a plurality of substantially different size associated cargo.

16. A kit for instructing the installation of an associated welding power supply onto an associated trailer having a trailer frame, one or more cross members selectively positionable along the frame, an axle operatively connected to the trailer frame and one or more ground engaging wheels rotatably connected to the axle, wherein the trailer frame includes a first side and a second side transverse to the axle, the kit comprising:
at least a first label for indicating the position for installing the one or more cross members positioned beneath the associated power supply supporting at least a portion thereof corresponding to the associated welding power supply onto the associated trailer, and wherein the cross members are substantially parallel to the first axle and fastened to the first and second sides.

17. The kit as defined in claim 16, wherein the at least a first label indicates the position for installing the associated welding power supply onto the associated trailer relative to the associated axle.

18. The kit as defined in claim 16, further comprising: instructions for installing the associated welding power supply onto the associated trailer.

19. The kit as defined in claim 18, wherein the instructions are printed instructions directing the user to position the associated welding power supply corresponding to the at least a first label.

20. The kit as defined in claim 19, wherein the at least a first label depicts a series of indicator marks for installing one of a plurality of substantially different size welders.

21. A method for indicating placement of an associated welding power supply on a trailer, comprising the steps of:
providing a trailer having
a payload region,
a trailer frame supporting the payload region,
at least a first axle operatively connected to the trailer frame, wherein the trailer frame includes a first side and a second side transverse to the first axle, and
one or more cross members selectively positionable along the frame corresponding to an associated welding power supply, the cross members positioned beneath the associated power supply supporting at least a portion thereof, wherein the cross members are transverse to the first and second sides and fastened to the first and second sides;
marking the trailer with indicia for selectively positioning the one or more cross members corresponding to the associated welding power supply in the payload region aligning the center of gravity of the power supply substantially above the first axle and providing a desired tongue weight for towing.

* * * * *